H. F. KIRKWOOD.
ELECTRIC TOASTER AND BROILER.
APPLICATION FILED JUNE 7, 1913.
1,116,442.
Patented Nov. 10, 1914.
2 SHEETS—SHEET 2.
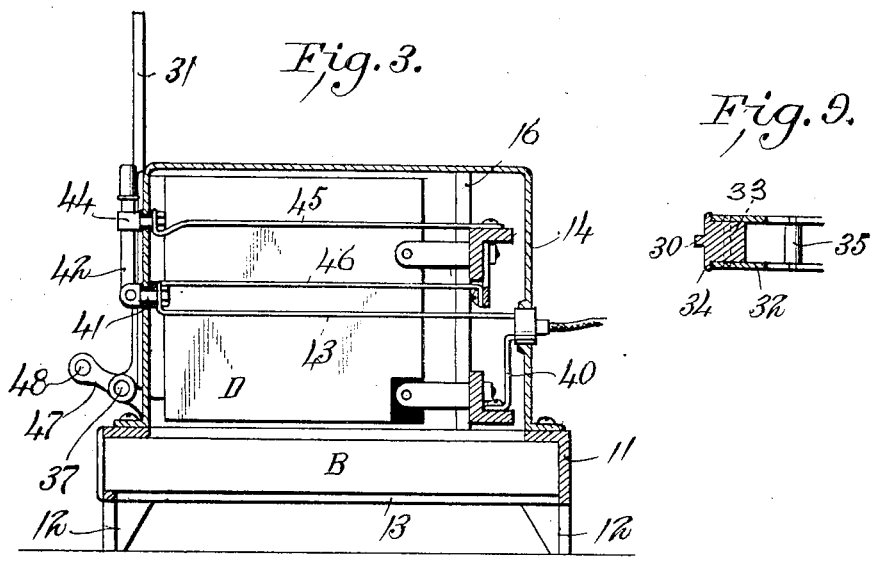
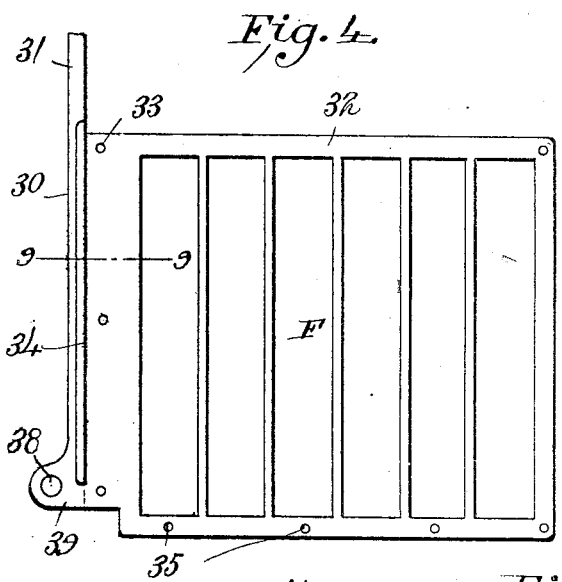
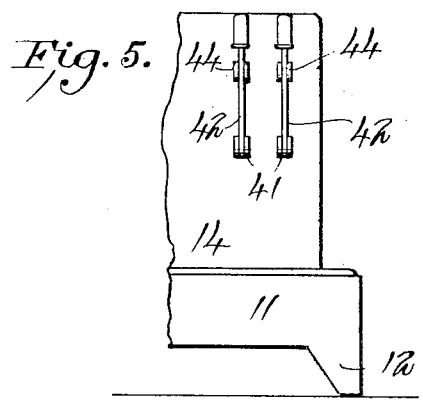
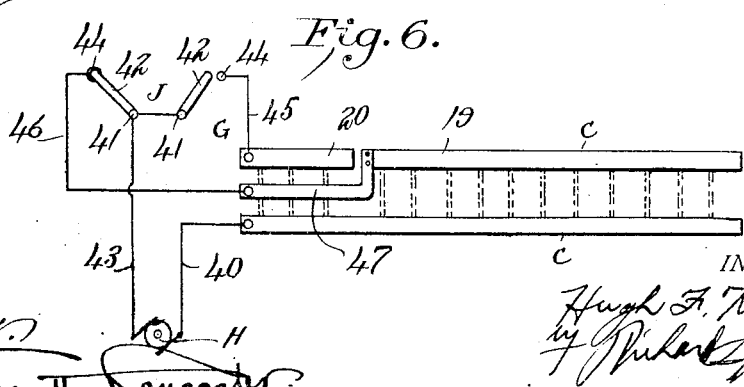
WITNESSES
INVENTOR
Hugh F. Kirkwood,
his Attorney

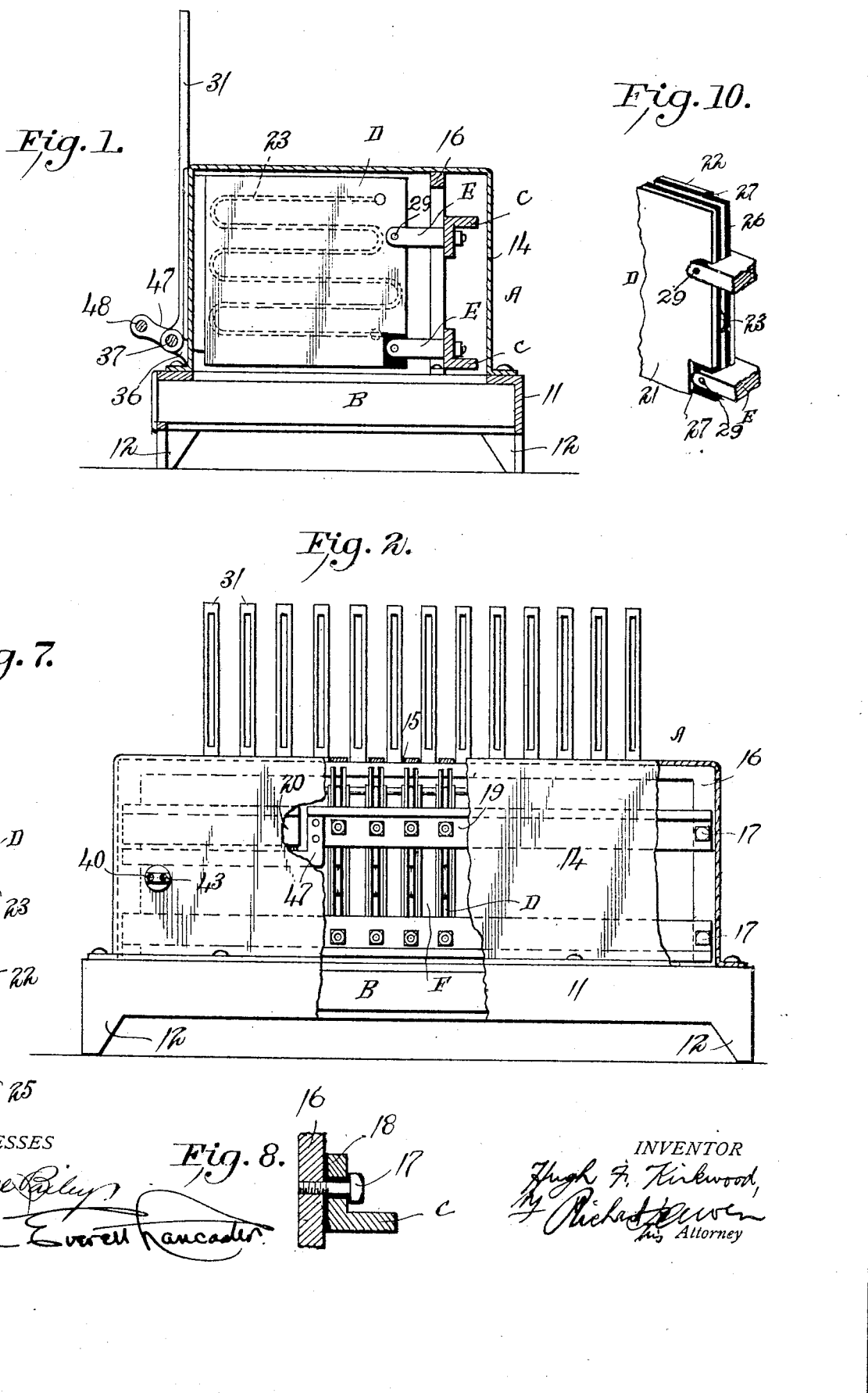

UNITED STATES PATENT OFFICE.

HUGH F. KIRKWOOD, OF KINEO, MAINE.

ELECTRIC TOASTER AND BROILER.

1,116,442. Specification of Letters Patent. Patented Nov. 10, 1914.

Application filed June 7, 1913. Serial No. 772,443.

*To all whom it may concern:*

Be it known that I, HUGH F. KIRKWOOD, a citizen of the United States, residing at Kineo, in the county of Piscataquis and State of Maine, have invented certain new and useful Improvements in Electric Toasters and Broilers, of which the following is a specification.

My present invention relates to electrical devices, such as are used for the toasting or broiling of food stuff.

The principal objects of my invention are to provide a device of the character described which is simple in construction, and hence, inexpensive to manufacture; one in which the parts are readily accessible for repairs; and, one in which the heating elements are so disposed that little heat is dissipated in the surrounding air space but is conducted to effectively act upon the food stuff.

A further object of the invention is to provide means whereby the crumbs or loose particles of food may find their way to a suitable receptacle and not become lodged about the conducting elements of the device.

Other objects of the invention are to provide means whereby a certain part of the device alone may be brought into use when it is not desired to utilize the device to its full capacity; and, to provide a device which may be operated by persons unfamiliar with the make up of the same in so far as the heating elements and conductors closely adjacent the same are concerned.

Other objects of the invention will appear in the following detailed description taken in connection with the accompanying drawings forming a part of this specification, and in which drawings:

Figure 1 is a transverse sectional view taken through the device, certain parts of the heating element being shown by dotted lines. Fig. 2 is a rear elevation of the device, parts of the frame being broken away and removed to disclose the details. Fig. 3 is a view similar to Fig. 1, showing the electrical connections. Fig. 4 is a side elevation of a carrier for the food stuff. Fig. 5 is a fragmentary view in elevation showing switches for controlling the current. Fig. 6 is a diagrammatic view showing the electric circuit. Fig. 7 is a sectional view through the heating element. Fig. 8 is a sectional view through a portion of the frame work and a bus bar used in distributing the current. Fig. 9 is a sectional view on line 9—9 of Fig. 4. Fig. 10 is a fragmentary perspective view showing a heating element supported by distributing conductor clips.

In the drawings, where similar characters refer to similar parts, A designates a suitable frame work, B a receptacle carried thereby, D heating elements supported by said frame work and F, carriers for the food stuff.

The frame A is suitably built up of a base portion 11, having legs 12 and a ridge 13 upon which the receptacle B slides; an upper casing 14 having openings 15 for a purpose to be subsequently set forth; and, a bracing means 16 within casing 14. It is to be noted that the casing 14 is open at its bottom to the receptacle B which is preferably in the form of a pan and also, when the receptacle is removed, access may be gained to the interior of casing 14 for removing or placing of elements therein.

The frame A carries, as through bracing means 16, a plurality of bus bars C, preferably angular in cross section in order that they may more readily support the elements to be subsequently described. These bars are connected to the bracing means 16 as by bolts 17, suitable insulation 18 being interposed between the members in order that the bars will not be short circuited. The bars are preferably disposed in parallelism, and it is to be noted, more particularly by reference to Figs. 6 and 7, that one of the bars is divided into two members 19 and 20, for the purpose of enabling a certain section of the device to be brought into use when it is not desired to utilize the device to its full capacity.

Disposed within the casing 14 are a plurality of heating elements D arranged in spaced apart relation to each other. Each heating element is built up of two plates 21 and 22 disposed in juxtaposed relation to each other, and a coil 23 intermediate said plates, insulated laterally therefrom but having its leads 24 and 25 conductively connected with the plates 21 and 22, respectively. The coil 23 may be insulated from the plates as by sheets of insulation 26, such as mica interposed between the coil and plates, leads passing through this insulation as clearly shown in Fig. 7 of the drawing. For a purpose to be subsequently set forth, each plate has a cut out portion 27 open to adjacent margins, but these cut out portions are not complemental. In other words, as clearly shown in Fig. 10 of the drawing, the one plate, that designated 21 has its cut out portion 27 adjacent the lower margin, while the other plate, that designated 22, has its cut out portion adjacent the upper margin, thus leaving a portion of the insulation 26 exposed laterally of the heating element.

The heating elements D are brought into conductive communication with the bus bars C through the distributing conductor clips E, as clearly shown in Fig. 10 of the drawings. These clips are bolted or otherwise secured to the bus bars and their prongs 28 engage with members of the heating element. One prong contacts with one of the conducting plates while the other prong engages the insulation 26, this latter prong being accommodated by the cut out portion of the other plate. If desired, a locking pin 29 may be inserted through the prongs and plate which the clip embraces, the provision of the clips being to facilitate placing or removal of the heating element and an efficient supporting of the same when desired as well as forming a conducting means for a current through the coil 23.

Referring now to the carrier F for food stuff, the preferred form is more clearly shown in Figs. 4 and 9 of the drawing, in which 30 is a suitable front wall having a handle 31; 32 open work side plates secured to the front wall 30 as by rivets 33 and to the outwardly extending flange 34 formed on said front wall; and, transverse bars 35 rigidly holding the plates 32 in spaced apart relation to each other. The carrier is pivotally mounted in connection with the frame A as by brackets 36 and rod 37 extending through the aperture 38 in a projection 39 formed on the front wall. When it is desired to insert food stuff between the plates 32, to be supported upon the cross bars 35, the handle 31 is grasped and the entire carrier swung so as to extend from the openings 15 in the casing 14, the food stuff being placed on the front wall, and any loose crumbs are held from falling until the carrier is over receptacle B.

The carriers are so disposed as to lie intermediate the heating elements D when they are within the casing 14 as is clearly shown in Fig. 2 of the drawings and the heat generated in the coils 23 is conducted through the insulation, the plates of the heating elements, and about the food stuff because of the open work plates 32. It is to be noted that any loose particles of the food stuff may readily find their way to the receptacle B, because of the transverse bars 35 and therefore, the same does not become lodged about the conducting elements of the device which has caused heretofore much trouble in short circuiting the conductors in devices now in common use.

In Fig. 6 I have shown, by means of a diagram, a circuit G whereby the bus bars C are brought into conductive relation with the poles of a generator H. One of the poles of the generator is conductively connected with one of the bus bars as by wire 40, the other pole being conductively connected with the poles 41 of the switches 42 making up the controlling means J for the circuit, as by wire 43. One of the switch points 44 is in conductive communication with the section 20 of one of the bus bars as by wire 45, while the other switch point 44 has conductive communication with the section 19 of the bus bar, as by wire 46.

An auxiliary bus bar 47 is interposed between the section 19 and the wire 46 inasmuch as this portion of the device is subjected to intense heat.

As a suitable means for limiting the amplitude of oscillation of the carriers F, the bracket 36 is extended as at 37 to carry a rod 48, extending parallel with the rod 37, and with which the front walls 30 contact when the side plates 32 are swung outwardly from the casing 14.

The operation of the device is as follows: The carriers are actuated as hereinbefore described for the purpose of inserting food stuff between its plates and each returned to its normal position lying intermediate the heating elements D which are disposed in an upright position. Any loose matter within the carriers drops freely into the receptacle B. The switch arms 42 are actuated according as to whether the entire device is to be used or merely one or the other section thereof and a current passes through one bus bar, and through the coil 23 of each heating element, by means of the distributing conductor clips E.

It is to be noted that, by removing the receptacle B, access may be gained to the interior of the casing 14 by tipping the entire device with two of the legs serving as pivots. The clips E may be of such construction as to hold the heating elements without the aid of locking pins 29, although the latter may be desirable in some instances.

Changes in details may be made without departing from the spirit or scope of my invention; but,

I claim:

1. In an electric toaster and broiler, the combination of a frame, a plurality of upright heating elements disposed in spaced apart relation to each other carried by said frame, a carrier for said food stuff carried by said frame to be moved intermediate said heating elements, and means rigid with said frame for limiting the amplitude of oscillation of said carrier.

2. In an electric toaster and broiler, the combination of an upright heating element, and a carrier for food stuffs to be normally positioned next adjacent to said heating element, oscillatable about a horizontal axis and comprising open work side plates and an imperforate front wall, said imperforate front wall to serve as a base when the carrier is swung outwardly from operative relation to said heating element and when placing the food stuffs.

3. In an electric toaster and broiler, the combination of a heating element comprising two juxtaposed plates each having a cut out portion open to adjacent margins but not complementary, and a coil intermediate said plates, insulated laterally therefrom but having its leads conductively connected one to each of said plates; and, distributing conductor clips one embracing each plate with its one prong in contact with its respective plate, and its other prong accommodated by the said cut out portion of the other plate.

4. In an electric toaster and broiler, the combination of a heating element comprising two juxtaposed plates each having a cut out portion open to adjacent margins but not complementary, two sheets of insulation intermediate said plates and extending beyond the margins of the said cut out portions thereof and a coil intermediate said sheets of insulation and having its leads conductively connected one to each of said plates; and, distributing conductor clips one embracing each plate with its one prong in contact with its respective plate and its other prong accommodated by the said cut out portion of the other plate and engaging the insulation adjacent the said cut out portion.

5. As an article of manufacture, a heating element comprising two juxtaposed plates each having a cut out portion open to adjacent margins but not complementary, and a coil intermediate said plates, insulated laterally therefrom but having its leads conductively connected one to each of said plates.

In testimony whereof I affix my signature in presence of two witnesses.

HUGH F. KIRKWOOD.

Witnesses:
GEO. A. FARRINGTON,
CRAWFORD JOHNSON.